United States Patent [19]
Hagberg

[11] 4,295,969
[45] Oct. 20, 1981

[54] MAGNETIC FUEL PURIFIER WITH ROTATING PRE-PURIFIER

[75] Inventor: Gideon Hagberg, Halmstad, Sweden

[73] Assignees: Gunner Berg, Glumslov; Sven-Olle Ströberg, Helsingborg, both of Sweden

[21] Appl. No.: 80,304

[22] Filed: Oct. 1, 1979

[30] Foreign Application Priority Data

Oct. 2, 1978 [SE] Sweden ............ 7810289

[51] Int. Cl.[3] ............ B01D 35/06
[52] U.S. Cl. ............ 210/223; 210/446
[58] Field of Search ............ 210/94, 222, 223, 168, 210/446

[56] References Cited

U.S. PATENT DOCUMENTS

| | | | |
|---|---|---|---|
| 1,602,935 | 10/1926 | Rasey | 210/223 |
| 2,117,361 | 5/1938 | Roihrbach | 210/223 |
| 2,236,769 | 4/1941 | Armbrusser | 210/223 |
| 2,732,943 | 1/1956 | Hagberg | 210/223 |
| 2,914,178 | 11/1959 | Edelen | 210/222 |
| 2,915,185 | 12/1959 | Walecherr, Jr. | 210/222 |
| 2,926,787 | 3/1960 | Combest | 210/223 |

FOREIGN PATENT DOCUMENTS

| | | | |
|---|---|---|---|
| 1160130 | 12/1963 | Fed. Rep. of Germany | 210/223 |
| 1107367 | 12/1955 | France | 210/223 |

*Primary Examiner*—Theodore A. Granger
*Attorney, Agent, or Firm*—Fleit & Jacobson

[57] ABSTRACT

A magnetic fuel purifier with double purifying effect for liquid fuel and the like equipped with an inner pre-purifier rotating around a center shaft and an outer purifier, where the fuel passes through an especially sintered bronze ball filter. Further, the center shaft at the bottom is equipped with a rigidly applied surrounding magnet 6 to pick up magnetic particles from the fuel. The case for the fuel purifier is made from transparent non-magnetic material that is as clear as glass to make it easier to check when the purifier is filled with contaminations and needs to be emptied and cleaned.

5 Claims, 17 Drawing Figures

FIG. 4
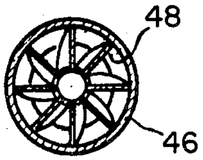
FIG. 1
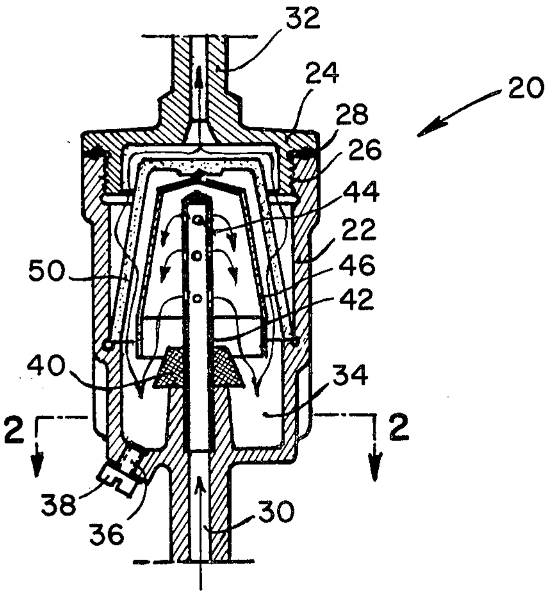
FIG. 3
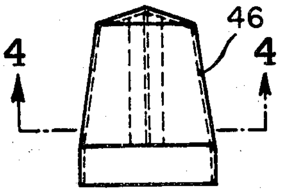
FIG. 5
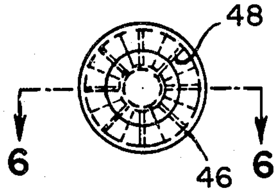
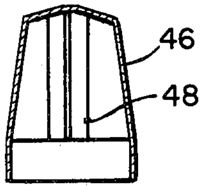
FIG. 6
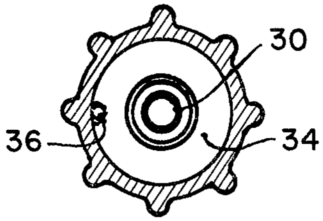
FIG. 2

FIG. 10
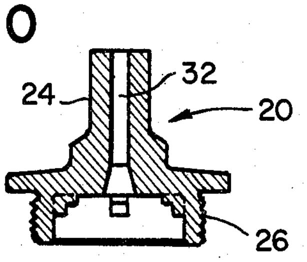
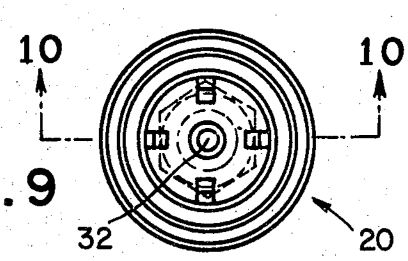
FIG. 9
FIG. 12
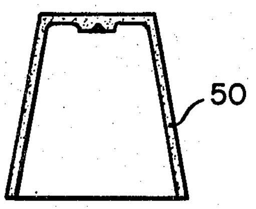
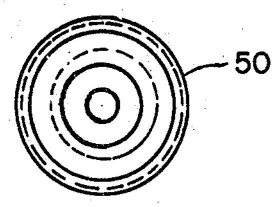
FIG. 11
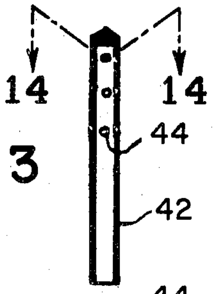
FIG. 13
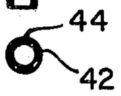
FIG. 14
FIG. 8
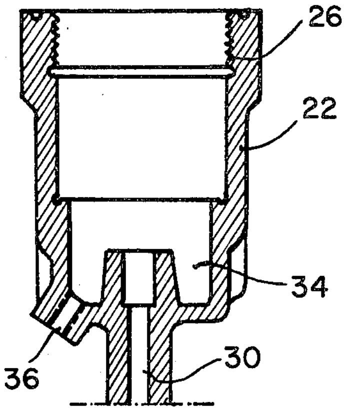
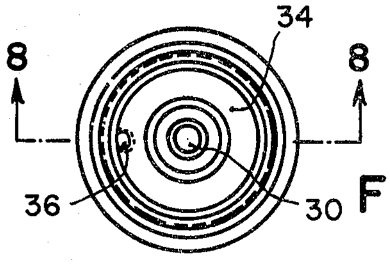
FIG. 7
FIG. 16
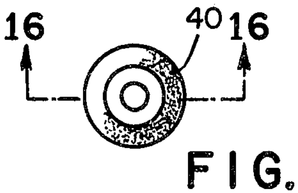
FIG. 15
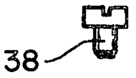
FIG. 17

MAGNETIC FUEL PURIFIER WITH ROTATING PRE-PURIFIER

BACKGROUND OF THE INVENTION

1. Field of the Invention

The present invention relates to fuel purifiers. More particularly, the invention relates to the field of fuel purifiers providing double purifying.

2. Description of the Prior Art

Already known magnetic fuel purifiers have the disadvantages in common that they are heavy, clumsy, and difficult to clean. The purifiers also accumulate moisture, which then is let through together with fine particles of contaminations and clogs ducts in carburettors, nozzles, and pump systems and exposes engines to unnecessary wear.

SUMMARY OF THE INVENTION

The purpose of the present invention is to eliminate these disadvantages by providing a fuel purifier that purifies the fuel completely effectively, is easy to check and clean, is in working order in all positions and temperature changes, and can be connected to flexible or rigid fuel lines for diesel and gasoline driven engines. The purifier is light in weight and handy without being difficult in either production or in price aspects.

The present invention provides a double acting fuel purifier. The fuel purifier includes a center shaft having ducts for admitting fluid into the filter housing, a conical magnet surrounding the center shaft at a level below the outlets of the ducts, and a conical filter consisting of sintered bronze ball material for trapping water and microscopically fine particles. Thus, the fuel purifier of the present invention provides a double purifying effect.

The novelty of the invention is clear from the attached claims, and furthermore, the invention will be described with application examples in reference to the attached drawings, but it is understood that the invention is not confined to only the described embodiments but also applies to all kinds of modifications within the frame of the invention.

BRIEF DESCRIPTION OF THE DRAWINGS

In the detailed description of a preferred embodiment of the invention hereinafter presented, reference is made to the accompany drawings, in which:

FIG. 1 is a schematic longitudinal cross-section of one embodiment of a magnetic fuel purifier according to the present invention;

FIG. 2 is a view taken along line 2—2 of FIG. 1 illustrating a portion of a collecting container used with the fuel purifier illustrated in FIG. 1;

FIG. 3 is a schematic front view of a pre-purifier used with the fuel purifier illustrated in FIG. 1;

FIG. 4 is a view taken along line 4—4 of FIG. 3 illustrating rotation blades used with the fuel purifier illustrated in FIG. 1;

FIG. 5 is a schematic top view of the pre-purifier illustrated in FIG. 4;

FIG. 6 is a view along line 6—6 of FIG. 5;

FIG. 7 is a schematic top view of an outer cover of the fuel purifier illustrated in FIG. 1;

FIG. 8 is a view along 8—8 of FIG. 7;

FIG. 9 is a bottom view of a lid of the fuel purifier illustrated in FIG. 1;

FIG. 10 is a view along line 10—10 of FIG. 9;

FIG. 11 is a bottom view of an outer purifier of the fuel purifier illustrated in FIG. 1;

FIG. 12 is a longitudinal cross-section of the outer purifier illustrated in FIG. 11;

FIG. 13 is a schematic cross-section of the center shaft of the fuel purifier illustrated in FIG. 1;

FIG. 14 is a view along line 14—14 of FIG. 13;

FIG. 15 is a top view of a magnet used with the fuel purifier illustrated in FIG. 1;

FIG. 16 is a view taken along line 16—16 of FIG. 15; and

FIG. 17 illustrates a sealing screw and washer that are usable to close a drain hole of the fuel purifier illustrated in FIG. 1.

DESCRIPTION OF THE PREFERRED EMBODIMENT

Because fuel purifiers are well-known, the present description will be directed in particular to elements forming of, or cooperating more directly with, the present invention. Elements not specifically shown or described herein are understood to be selectable from those known in the art.

Referring now to the drawings and to FIG. 1 in particular, one embodiment of the present invention is illustrated and will be described in connection with a fuel purifier, generally designated 20. The purifier 20 has a lower housing member or outer case 22 and an upper housing member or lid 24 that are interconnected to each other by complimentary threads 26 formed on facing portions of the members. A sealing ring 28 is provided to ensure a fluid-tight connection. As can be seen from FIGS. 8 and 10, respectively, the outer case 22 has an outlet 30, while the lid 24 has an outlet 32.

As can be seen from FIGS. 1 and 2, the outer case 22 defines a collecting chamber or container 34 having a drain hole 36 sealed by a sealing screw 38 of the type illustrated in FIG. 17. The lower housing member 22 has an upstanding collar for supporting a conical magnet 40 of the type illustrated in FIGS. 15 and 16. The support is hollow and receives a center shaft 42 that is in fluid communication with the intake pipe 30. As illustrated in FIGS. 13 and 14, the shaft 42 has a plurality of ducts 44 for admitting fluid into the interior of the purifier 20.

Referring again to FIG. 1, it can be seen that a pre-purifier 46 is located within the purifier 20 and is spaced from the shaft 42. As illustrated in FIGS. 3 to 6, the pre-purifier 46 has a plurality of pitching longitudinal wing blades 48 that have inner ends surrounding the shaft 42. Portions of the blades or a small collar formed at the bottom of the blades contacts the top of the magnet 40 to limit downward movement of the pre-purifier.

As illustrated in FIGS. 1, 11 and 12, a conical filter 50 is spaced from and surrounds the pre-purifier 46. An inner portion of the filter 50 has an opening formed therein for receiving a projecting portion of the pre-purifier 46. In this manner, the pre-purifier 46 is centered in housing members 22 and 24.

Considering use of the present invention, a magnetic fuel purifier with rotating pre-purifier according to invention, when used with carburettor engines, is preferably connected to the fuel line between the fuel pump and the carburettor. The purifier, when used with diesel engines, is preferably positioned in the fuel line between the fuel pump and the injector system. In both cases, the purifier is connected in such a way that the intake pipe 30 of the fuel purifier will be closest to the fuel tank, and the outlet pipe 32 of the fuel purifier will be closest to the carburettor or the injector system.

Fuel passes through the fuel purifier 20 partly because of over and under pressure effects from the fuel pump and carburettor/injector system, respectively. The movably applied pre-purifier 46, through its pitching longitudinal wing blades 48, which with easy fit to their entire extent are touching the center shaft 42, are made to rotate so that the fuel is thrown against the conical walls of the pre-purifier 46 and falls downwards towards the collecting container 34. The falling fuel passes the conical magnet 40, which is firmly applied to the center shaft 42. It should be pointed out that the center shaft 42, which is made from a non-magnetic material, for instance, plastic material, also works as an inlet valve for the fuel with direct connection to the fuel line or inlet 30. The center shaft is consequently tubular and sealed at is upper end and on its long sides furnished with a number of ducts 44, where the fuel flows into the fuel purifier.

Thereafter, the pre-purified fuel continues through a firmly applied conical filter 50, consisting of sintered bronze ball material, which filtering threshold is preferably 60 microns with a pore volume of 40 percent by volume that prevents passage of water and microscopically fine particles. (According to manufacturer's guarantee as regards bronze ball filters that earlier have been drowned in gasoline.) The purified fuel continues finally out of the fuel purifier through the outlet pipe 32. The outer case 22 of the fuel purifier with the collecting container 34 and the inlet pipe 30, as well as the lid 24, are made from non-magnetic transparent material that is as clear as glass, by injecting moulding, to facilitate manufacturing and to facilitiate checking to see when the collecting container is filled and needs to be emptied. Emptying and cleaning of the container 34 is done through the drain hole 36 after the removal of the sealing screw 38. To obtain the best possible sealing security between the outer case 22 and its lid 24, these are provided with threads 26 and a sealing ring 28.

Previously, a specific embodiment of the present invention has been described. It should be appreciated, however, that this embodiment has been described for the purposes of illustration only, without any intention of limiting the scope of the present invention. Rather, it is the intention that the present invention be limited only by the appended claims.

What is claimed is:

1. Magnetic fuel purifier with rotating pre-purifier for liquid fuel and the like with separation of contaminations, partly by centrifugalizing and partly by magnetic action, comprising a conical pre-purifier (46); a tubular, non-magnetic center shaft (42) for supporting the pre-purifier, the center shaft being an inlet for the fuel and having a plurality of through-going ducts (44) for the passage of fuel, said pre-purifier having pitching longitudinal wing blades (48) rotated by the fuel pressure, whereby the fuel is thrown against conical outer walls of the pre-purifier and thereafter falls downwards; a conical magnet (40) surrounding and firmly applied to the center shaft below the pre-purifier in such manner that the falling fuel strikes the magnet; a collecting container (34) positioned below the magnet; a conical filter (50) surrounding the pre-purifier in sucn manner that fuel flows from the collecting container through the conical filter out of the purifier, the conical filter being made from sintered bronze ball material; an outer case (22) for holding the pre-purifier, conical magnet, and conical filter and for forming the collecting container; and a lid (24) connected to the outer case, the outer case and lid being made from non-magnetic, transparent material; said blades (48) of said pre-purifier (46) extending inwardly from the outer walls towards the center shaft (42), said pre-purifier (46) having a closed top with a portion of its upper surface shaped to mate with a portion of the conical filter (50) to thereby center said pre-purifier (46) in said outer case (22), said outer case (22) having a through duct (30) formed in a lower portion thereof communicating with the interior of said center shaft (42) for introducing fuel into said purifier, and said lid (24) having a through duct (32) for passage of purified fuel out of said purifier, said outer walls of said pre-purifier (46) being spaced from and at least partially encompassed by said conical filter (50) so that a fluid flow path is defined therebetween, fuel flowing upwardly from said collecting container (34) into said fluid flow path and through said conical filter (50) into said duct (32) of said lid (24).

2. Magnetic fuel purifier according to claim 1 wherein said plurality of pitching wing blades (48) extend longitudinally and have inner edges that contact with easy fit said center shaft (42) to achieve stability.

3. Magnetic purifier according to claim 1 or 2, wherein said pre-purifier (46) has an open lower part, and wherein said conical magnet (40) is rigidly connected to said center shaft (42) to pick up magnetic particles from fuel leaving said pre-purifier.

4. Magnetic fuel purifier according to claim 3, wherein said center shaft (42) is a tubular member made of non-magnetic material, said shaft being sealed, at its upper end and said through-going ducts (44) being spaced from said sealed end, and wherein said intake pipe (30) communicates with a lower end of said shaft in such manner that said shaft acts as a fuel valve.

5. Magnetic purifier according to claim 1 or 2, wherein said center shaft (42) is a tubular member made of non-magnetic material, said shaft being sealed at its upper end and said through-going ducts (44) being spaced from said sealed end, and wherein said intake pipe (30) communicates with a lower end of said shaft in such manner that said shaft acts as a fuel valve.

* * * * *